US011928210B2

United States Patent
Chan et al.

(10) Patent No.: US 11,928,210 B2
(45) Date of Patent: Mar. 12, 2024

(54) MODULE AND METHOD FOR MONITORING SYSTEMS OF A HOST DEVICE FOR SECURITY EXPLOITATIONS

(71) Applicant: FLEXXON PTE. LTD., Singapore (SG)

(72) Inventors: Mei Ling Chan, Singapore (SG); Nizar Bouguerra, Singapore (SG)

(73) Assignee: FLEXXON PTE. LTD., Singapore (SG)

( * ) Notice: Subject to any disclaimer, the term of this patent is extended or adjusted under 35 U.S.C. 154(b) by 0 days.

(21) Appl. No.: 18/115,341

(22) Filed: Feb. 28, 2023

(65) Prior Publication Data

US 2023/0281302 A1    Sep. 7, 2023

(30) Foreign Application Priority Data

Mar. 2, 2022    (SG) ............................ 10202202093X (51) Int. Cl.
*G06F 21/55* (2013.01)
*G06F 12/08* (2016.01)
*G06F 13/28* (2006.01)

(52) U.S. Cl.
CPC ............ *G06F 21/552* (2013.01); *G06F 12/08* (2013.01); *G06F 13/28* (2013.01); *G06F 2212/657* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 5,051,996 A | * | 9/1991 | Bergeson | G06F 11/277 714/732 |
| 7,757,290 B2 | * | 7/2010 | Costea | G06F 21/567 713/188 |
| 9,842,209 B2 | * | 12/2017 | Tamir | G06F 21/552 |
| 2007/0288739 A1 | | 12/2007 | Dale et al. | |
| 2009/0193230 A1 | | 7/2009 | Findeisen et al. | |
| 2011/0060947 A1 | * | 3/2011 | Song | G06F 21/53 718/1 |
| 2013/0013905 A1 | * | 1/2013 | Held | G06F 21/572 713/2 |
| 2017/0257303 A1 | * | 9/2017 | Boyapalle | H04L 67/1001 |
| 2021/0312057 A1 | | 10/2021 | Kloth | |
| 2022/0358062 A1 | * | 11/2022 | Panzica | G06F 13/24 |

OTHER PUBLICATIONS

Search Report of Singaporean Application No. 10202202093X dated Apr. 1, 2022.
Written Opinion of Singaporean Application No. 10202202093X dated Apr. 19, 2022.
Written Opinion of Singaporean Application No. 10202202093X dated Aug. 12, 2022.

* cited by examiner

Primary Examiner — Christopher C Harris
(74) Attorney, Agent, or Firm — Burns & Levinson LLP; Steven M. Mills (57) ABSTRACT

This document described a module and method for monitoring systems of a host device for anomalous activities or security weaknesses. The module is configured to passively monitor the content contained within the main memory of the host device and data received by hardware components in the host device for anomalies or security weaknesses. When such anomalies are detected, the module will then initiate countermeasures to prevent the anomalies from affecting the host device and/or any storage/peripheral devices linked to the host device.

20 Claims, 3 Drawing Sheets

MODULE AND METHOD FOR MONITORING SYSTEMS OF A HOST DEVICE FOR SECURITY EXPLOITATIONS

CROSS-REFERENCE TO RELATED APPLICATIONS

This application claims the benefit of priority under 35 U.S.C. § 119 to SG Application No. 10202202093X, filed Mar. 2, 2022, which is incorporated herein by reference in its entirety.

FIELD OF THE INVENTION

This invention relates to a module and method for monitoring systems of a host device for anomalous activities or security weaknesses. The module is configured to passively monitor the content contained within the main memory of the host device and data received by hardware components in the host device for anomalies or security weaknesses. When such anomalies are detected, the module will then initiate countermeasures to prevent the anomalies from affecting the host device and/or any storage/peripheral devices linked to the host device.

SUMMARY OF PRIOR ART

Computing systems and/or electronic systems typically comprise at least one storage device/peripheral device and at least one host device that is communicatively connected to the storage/peripheral device. Storage devices typically comprise of solid state devices (SSDs), hard disk drives (HDDs), optical drives, or magnetic disc drives, peripheral devices typically comprise of any electronic device that may be controlled by a host device. As for host devices, such devices typically comprise of any hardware component having at least a CPU and a main memory whereby the hardware is configured to act as a host to storage/peripheral devices that are connected to it. Bus systems connecting the host to the storage/peripheral device enable the transfer of data to take place between these devices either through the CPU of the host device or directly from the device to the main memory of the host device. Examples of such bus systems would be the Peripheral Component Interconnect Express (PCI Express) bus standard, the Serial Peripheral Interface (SPI) bus standard, Serial ATA (SATA) bus standard and the direct memory access (DMA) system.

Unfortunately, such computing systems are frequently subject to security vulnerabilities. Certain types of security vulnerabilities target flaws in the code of operating systems or applications installed within the host device while other threats may target the firmware of the peripheral devices connected to the host device. For example, malicious parties may install malicious code into the firmware of the host device or within the dynamic random-access memory (DRAM) of the host device when the operating system is being updated or being rebooted. The malicious code may then remain dormant within the host device's firmware or DRAM until it detects an opportune time to awaken. For example, the malicious code may hide itself within the input-output memory management unit (10M M U) of the host device in order to avoid the security software's verification processes.

The malicious code may also modify the contents of the host device's RAM during the Power-On-Reset (POR) process allowing the malicious code to obtain any arbitrary code before the CPU boots up. This allows the malicious code to circumvent the BIOS and/or firmware verification processes. When activated, this hidden malware may then utilize this opportunity to modify and/or sabotage the host device's firmware, alter specific portions of the operating system and/or infiltrate and plant backdoors into existing applications or software. Such actions typically would not be detected by existing firewalls or network protection systems as the malware would have embedded itself into the operating system, and from there, would have gradually spread to other executable files in the system.

Undetected malware may eventually cause Trojan horses, backdoors, and viruses to be installed within the operation system and its software applications. As a result, irreparable security defects may occur in the software and in the homogeneity of the operating system. Malware may also exploit the security weakness in dynamic random-access memory (DRAM) to take control of the host device or to turn the memory module into a modified wireless transmitter that is configured to wirelessly transmit sensitive data over the air to unauthorized parties. The malware may also take control of any peripheral device that is in communication with the host to use the peripheral device as a one way radio frequency transmitter to leak sensitive data to third parties.

To address this issue, it has been proposed that security programs be installed within the storage devices of the computing systems whereby once the operating system has been booted up, these programs will then go on to monitor the operating system for threats and to scan executable files for malware before these files may be executed on the operating system. The downside to this approach is that malicious parties may actually reverse engineer these security programs and as a result, create new malware that may not be detected by these security programs. Furthermore, malicious parties may also insert malware into parts of the main memory that will be loaded before the operating system has completed its boot up process, e.g. UEFI or BIOS, thereby effectively circumventing any defensive measures accorded by the security programs.

For the above reasons, those skilled in the art are constantly striving to come up with a module and method that is capable of monitoring data transfer between a storage/peripheral device and a host device for anomalies in a passive manner.

SUMMARY OF THE INVENTION

The above and other problems are solved and an advance in the art is made by systems and methods provided by embodiments in accordance with the invention.

A first advantage of embodiments of modules and methods in accordance with the invention is that the module is able to detect anomalies in the main memory of the host device even before the operating system in the host device boots up.

A second advantage of embodiments of modules and methods in accordance with the invention is that the module is able continuously monitor the main memory of the host device in a passive manner.

A third advantage of embodiments of modules and methods in accordance with the invention is that the module is able to protect the host device and/or peripheral devices from ransomware threats as it is able to detect the threat before the threat is able to interact and alter the content in the host device and/or the peripheral device.

A fourth advantage of embodiments of modules and methods in accordance with the invention is that the module is able to monitor the main memory of the host device to detect and prevent threats from modifying the integrity of their firmware/software of either the host or peripheral devices.

The above advantages are provided by embodiments of a module and/or method in accordance with the invention operating in the following manner.

According to a first aspect of the invention, a security module comprising: an interface configured to connect to a bus system of a host device; a processor; and a non-transitory media readable by the processor is disclosed, the media storing instructions that when executed by the processor cause the processor to: capture diagnostic data transmitted through the bus system of the host device when diagnostic tests are executed by the host device during the Power-On-Reset (POR) cycle of the host device; obtain, from the captured diagnostic data, information associated with hardware components associated with the host device, whereby the obtained information is used to identify each of the hardware components and to retrieve databases associated with each of the identified hardware components; acquire new data associated with a first identified hardware component from the bus system; and determine, based on the newly acquired data and based on a retrieved database associated with the first identified hardware component, that a security violation is occurring at the first identified hardware component.

With regard to the first aspect of the invention, the obtained information associated with one of the hardware components comprise addresses of the host device's main memory and wherein the first identified hardware component comprises the host device's main memory, and further comprises instructions that when executed by the processor, before the step of determining that a security violation is occurring at the first identified hardware component, cause the processor to: generate a virtual disk based on the addresses of the host device's main memory; and write the newly acquired data to the virtual disk as the new data is concurrently acquired from the host device's main memory.

With regard to the first aspect of the invention, the instructions to determine that a security violation is occurring further comprises instructions that when executed by the processor cause the processor to: identify, based on the data newly written to the virtual disk, a software application that is being loaded in the main memory of the host device; retrieve, from the main memory, a checksum associated with the software application; and determine that the security violation is occurring at the main memory when the retrieved checksum does not match with a verified checksum obtained from the retrieved database associated with the main memory.

With regard to the first aspect of the invention, the instructions to determine that a security violation is occurring further comprises instructions that when executed by the processor cause the processor to: compare the newly written data in the virtual disk with malware patterns obtained from the retrieved database associated with the main memory; and determine that the security violation is occurring at the main memory when at least a part of the newly written data matches with the obtained malware patterns.

With regard to the first aspect of the invention, the malware patterns may comprise instructions to encrypt large parts of the main memory, instructions to modify a Unified Extensible Firmware Interface (UEFI) or Basic Input Output System (BIOS) of the host device, abnormal interrupt routines or instructions to continuously transmit data through unsecured wireless or wired transmission means.

With regard to the first aspect of the invention, the instructions to determine that a security violation is occurring further comprises instructions that when executed by the processor cause the processor to: provide the data newly written to the virtual disk to a trained supervised machine learning model, whereby the trained supervised machine learning model is configured to detect anomalies in the data; and determine that the security violation is occurring at the main memory when the number of detected anomalies exceeds a predetermined threshold.

With regard to the first aspect of the invention, the first identified hardware component comprises a direct memory access (DMA) enabled component and wherein the instructions to determine that a security violation is occurring further comprises instructions that when executed by the processor cause the processor to: compare the newly acquired data associated with the DMA enabled component with malware patterns obtained from the retrieved database associated with the DMA enabled component whereby it is determined that the security violation is occurring at the DMA enabled component when at least a part of the newly written data matches with the obtained malware patterns, wherein the newly acquired data comprises data that is directly addressed to the DMA enabled component or data that is generated directly by the DMA enabled component.

With regard to the first aspect of the invention, the first identified hardware component comprises an electronic device and wherein the instructions to determine that a security violation is occurring further comprises instructions that when executed by the processor cause the processor to: compare the newly acquired data associated with the electronic device with malware patterns obtained from the retrieved database associated with the electronic device whereby it is determined that the security violation is occurring at the electronic device when at least a part of the newly written data matches with the obtained malware patterns.

With regard to the first aspect of the invention, the first identified hardware component comprises a peripheral device and wherein the instructions to determine that a security violation is occurring further comprises instructions that when executed by the processor cause the processor to: compare the newly acquired data associated with the peripheral device with malware patterns obtained from the retrieved database associated with the peripheral device whereby it is determined that the security violation is occurring at the peripheral device when at least a part of the newly written data matches with the obtained malware patterns.

With regard to the first aspect of the invention, the security module further comprises instructions that when executed by the processor cause the processor to: acquire new data associated with a second identified hardware component from the bus system; and determine, based on the newly acquired data and based on a retrieved database associated with the second identified hardware component, that a security violation is occurring at the second identified hardware component.

According to a second aspect of the invention, a method for detecting security violations associated with a host device using a security module communicatively connected to a bus system of the host device is disclosed, the method comprising the steps of: capturing, using the security module, diagnostic data transmitted through the bus system of the host device when diagnostic tests are executed by the host device during a Power-On-Reset (POR) cycle of the host device; obtaining from the captured diagnostic data, using the security module, information associated with hardware components associated with the host device, whereby the obtained information is used to identify each of the hardware components and to retrieve databases associated with each of the identified hardware components; acquiring, using the security module, new data associated with a first identified hardware component from the bus system; and determining based on the newly acquired data and based on a retrieved database associated with the first identified hardware component, using the security module, that a security violation is occurring at the first identified hardware component.

With regard to the second aspect of the invention, the obtained information associated with one of the hardware components comprise addresses of the host device's main memory and wherein the first identified hardware component comprises the host device's main memory, and before the step of determining that a security violation is occurring at the first identified hardware component, the method further comprises the steps of: generating, using the security module, a virtual disk based on the addresses of the host device's main memory; and writing, using the security module, the newly acquired data to the virtual disk as the new data is concurrently acquired from the host device's main memory.

With regard to the second aspect of the invention, the determining that a security violation is occurring further comprises the steps of: identifying based on the data newly written to the virtual disk, using the security module, a software application that is being loaded in the main memory of the host device; retrieving from the main memory, using the security module, a checksum associated with the software application; and determining, using the security module, that the security violation is occurring at the main memory when the retrieved checksum does not match with a verified checksum obtained from the retrieved database associated with the main memory.

With regard to the second aspect of the invention, the determining that a security violation is occurring further the steps of: comparing, using the security module, the newly written data in the virtual disk with malware patterns obtained from the retrieved database associated with the main memory; and determining, using the security module, that the security violation is occurring at the main memory when at least a part of the newly written data matches with the obtained malware patterns.

With regard to the second aspect of the invention, the malware patterns may comprise instructions to encrypt large parts of the main memory, instructions to modify a Unified Extensible Firmware Interface (UEFI) or Basic Input Output System (BIOS) of the host device, abnormal interrupt routines or instructions to continuously transmit data through unsecured wireless or wired transmission means.

With regard to the second aspect of the invention, the determining that a security violation is occurring further comprises the steps of: providing, using the security module, the data newly written to the virtual disk to a trained supervised machine learning model, whereby the trained supervised machine learning model is configured to detect anomalies in the data; and determining, using the security module, that the security violation is occurring at the main memory when the number of detected anomalies exceeds a predetermined threshold.

With regard to the second aspect of the invention, the first identified hardware component comprises a direct memory access (DMA) enabled component and wherein the determining that a security violation is occurring further comprises the steps of: comparing, using the security module, the newly acquired data associated with the DMA enabled component with malware patterns obtained from the retrieved database associated with the DMA enabled component whereby it is determined that the security violation is occurring at the DMA enabled component when at least a part of the newly written data matches with the obtained malware patterns, wherein the newly acquired data comprises data that is directly addressed to the DMA enabled component or data that is generated directly by the DMA enabled component.

With regard to the second aspect of the invention, the first identified hardware component comprises an electronic device and wherein the determining that a security violation is occurring further comprises the steps of: comparing, using the security module, the newly acquired data associated with the electronic device with malware patterns obtained from the retrieved database associated with the electronic device whereby it is determined that the security violation is occurring at the electronic device when at least a part of the newly written data matches with the obtained malware patterns.

With regard to the second aspect of the invention, the first identified hardware component comprises a peripheral device and wherein the determining that a security violation is occurring further comprises the steps of: comparing, using the security module, the newly acquired data associated with the peripheral device with malware patterns obtained from the retrieved database associated with the peripheral device whereby it is determined that the security violation is occurring at the peripheral device when at least a part of the newly written data matches with the obtained malware patterns.

With regard to the second aspect of the invention, the method further comprises the steps of: acquiring, using the security module, new data associated with a second identified hardware component from the bus system; and determining, using the security module, based on the newly acquired data and based on a retrieved database associated with the second identified hardware component, that a security violation is occurring at the second identified hardware component.

BRIEF DESCRIPTION OF THE DRAWINGS

The above and other problems are solved by features and advantages of a system and method in accordance with the present invention described in the detailed description and shown in the following drawings.

DETAILED DESCRIPTION

This invention relates to a module and method for monitoring the main memory and hardware components of a host device for anomalous activities or security weaknesses, i.e. security violations. When such anomalies are detected, the module will then initiate countermeasures to prevent the anomalies from affecting the host device and/or any storage/peripheral devices that may be communicatively connected to the host device.

The present invention will now be described in detail with reference to several embodiments thereof as illustrated in the accompanying drawings. In the following description, numerous specific features are set forth in order to provide a thorough understanding of the embodiments of the present invention. It will be apparent, however, to one skilled in the art, that embodiments may be realised without some or all of the specific features. Such embodiments should also fall within the scope of the current invention. Further, certain process steps and/or structures in the following may not been described in detail and the reader will be referred to a corresponding citation so as to not obscure the present invention unnecessarily.

Further, one skilled in the art will recognize that many functional units in this description have been labelled as modules throughout the specification. The person skilled in the art will also recognize that a module may be implemented as circuits, logic chips or any sort of discrete component. Still further, one skilled in the art will also recognize that a module may be implemented in software which may then be executed by a variety of processor architectures. In embodiments of the invention, a module may also comprise computer instructions, firmware or executable code that may instruct a computer processor to carry out a sequence of events based on instructions received. The choice of the implementation of the modules is left as a design choice to a person skilled in the art and does not limit the scope of this invention in any way.

An exemplary process or method for monitoring the main memory and hardware components of a host device for anomalous activities or security weaknesses in accordance with embodiments of the invention is set out in the steps below.

Step 1: capture diagnostic data transmitted through the bus system of the host device when diagnostics tests are performed when the Power on Reset cycle is executed by the host device;

Step 2: obtain, from the captured diagnostic data, information associated with hardware components associated with the host device, whereby the obtained information is used to identify each of the hardware components and to retrieve databases associated with each of the identified hardware components;

Step 3: acquire new data associated with one or more of the identified hardware components from the bus system; and Step 4: determine, based on the newly acquired data and based on a retrieved database associated with the first identified hardware component that a security violation is occurring at the first identified hardware component.

In accordance with embodiments of the invention, the steps set out above may be carried out or executed by a hardware module that is connected to a bus system that communicatively connects a processor of the host device, peripheral devices, main memory (comprising volatile and/or non-volatile memory) of the host device, hardware components of the host device, and an input/output hub together. The steps above may also be carried out or executed by a software module provided either at the host device and/or at a connected peripheral device.

Figure 1:
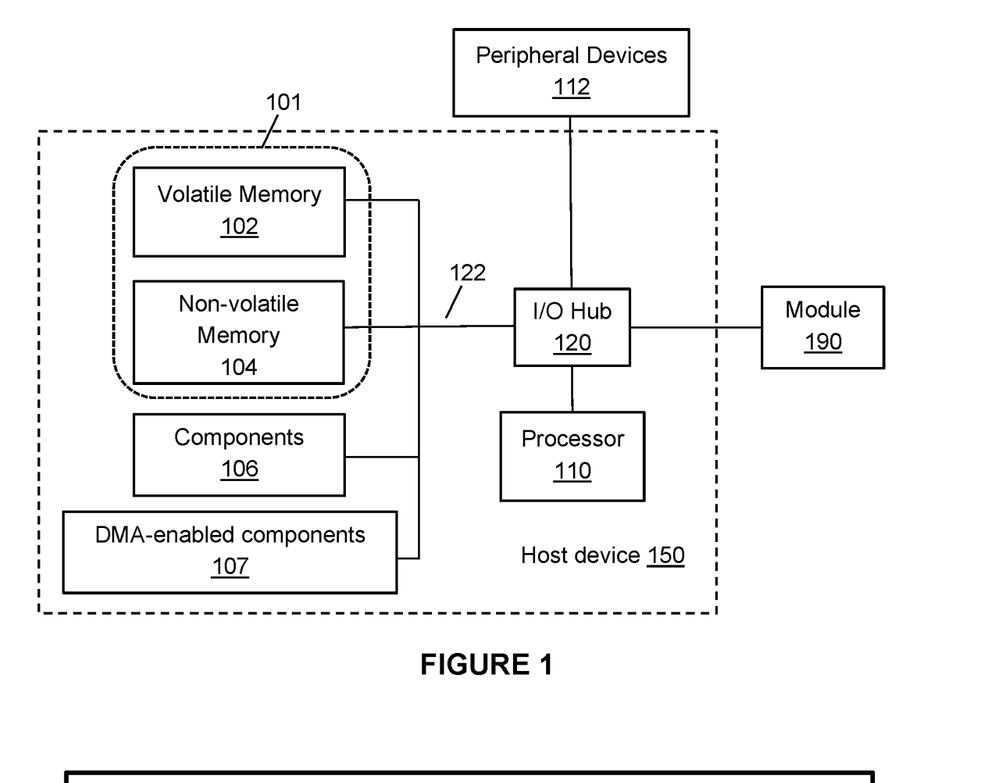
FIG. 1 illustrating a block diagram of a system for monitoring systems of a host device for anomalous activities or security weaknesses in accordance with embodiments of the invention.

A block diagram of a system for monitoring the main memory and hardware components of a host device for anomalous activities or security weaknesses in accordance with embodiments of the invention is illustrated in FIG. 1.

FIG. 1 illustrates host device 150 which generally may comprise any hardware device that has a CPU and a main memory that comprises volatile and non-volatile memory that may be accessed via the CPU or directly through a DMA system. Some examples of host devices include, but are not limited to, computers, personal electronic devices, thin clients, and multi-functional devices. In particular, almost any kind of computer, including a centralized mainframe, a server or a desktop personal computer (PC) may be configured as a host device. In contrast, a peripheral device typically comprises (but is not limited to) a router or switch that is configured to direct traffic, or any electronic device that may be controlled by the host device and a storage device usually comprises (but is not limited to) solid state devices (SSDs), hard disk drives (HDDs), optical drives, or magnetic disc drives.

As illustrated in FIG. 1, host device 150 comprises main memory 101 made up of volatile memory 102 and non-volatile memory 104, components 106, and DMA enabled components 107 which are connected to processor 110 through input/output (I/O) hub 120 via bus system 122. Host device 150 is also communicatively connected to peripheral devices 112 and security module 190 through I/O hub 120. Components 106 may comprise of any electronic components or hardware devices that are usually provided within a computing device such as, but not limited to, a graphics card having a GPU, electrically erasable programmable read-only memory (EEPROM), primary and secondary storage devices, DVD Drives, a cache and etc. and DMA enabled components may comprise of any electronic or hardware components that are configured to transfer data directly with external peripheral devices through a DMA system. As for I/O hub 120, hub 120 may comprise, but is not limited to, any type of microchip that may be used to manage data communications between processor 110 and the various electronic components (i.e. memories 102 and 104, and components 106) in host device 150, and/or may include a DMA controller that allows data to be transferred to and from peripheral devices 112 directly to volatile memory 102 and non-volatile memory 104 without involving processor 110; or directly between peripheral devices 112 and DMA enabled components 107.

In embodiments of the invention, bus system 122 may include any type of bus or high-speed bus that is suitable for transferring data between the various components in host device 150 and processor 110, but is not limited to, a Serial Peripheral Interface (SPI) bus, a Low Pin Count (LPC) bus, an Inter-Integrated Circuit ($I^2C$) bus, a Peripheral Component Interconnect Express (PCI Express) bus, or a Serial ATA (SATA) bus.

Peripheral devices 112 may include any electronic device that may be operated as a slave device relative to host device 150 such as, but is not limited to, storage devices, or solid state devices involving non-volatile memories (i.e. read-only memories (ROMs)) or computer memories (i.e. random-access memories (RAMs)). Peripheral devices 112 may also include any electronic device which may be configured to directly (through a DMA system) or indirectly (through processor 110) send/receive data to/from the main memory and/or DMA-enabled hardware components (such as the GPU) of host device 150. In embodiments of the invention, peripheral devices 112 may also include another computing device configured to operate as a host device.

Security module 190 is configured to make use of I/O hub 120 to continuously monitor the content of main memory 101 and any data directly received or transmitted by DMA-enabled hardware components 107. In particular, module 190 is configured to capture data transmitted between processor 110 and main memory 101; between processor 110 and peripheral devices 112; between processor 110 and components 106; and between DMA-enable components 107 and peripheral devices 112 during diagnostic self-tests, such as, but are not limited to Power-On-Self-Tests, performed by the host device during the Power-on-Reset (POR) cycle of the host device.

It is useful to note that these diagnostic self-tests are performed by host device 150 during the POR cycle of host device 150. These tests actually comprise a sequence of diagnostic tests that are carried by the various hardware components of host device 150 and the code for these tests are usually provided within the EEPROM of host device 150. The detailed and exact workings of these diagnostics tests are known to one skilled in the art as such, they are omitted for brevity.

Amongst the diagnostic tests that will be carried out during the POR cycle include a processor (or CPU) test which tests the internal workings of processor 110. This test is usually carried out by having processor 110 execute a series of instructions and by verifying the output of the executed instructions.

Another diagnostic test that is usually carried out is the RAM march test which aims to test the integrity of main memory 101. During this test, processor 110 will be configured to run a series of tests to identify address line faults, data line faults and/or data loss in main memory 101. One skilled in the art will recognize that these tests may be simple or fairly complicated. Regardless of the testing method that is adopted, all the memory locations in main memory 101 will usually be tested and as a result, the addresses of all the memory locations in main memory 101 may be mapped once this diagnostic test has been completed.

A DMA controller test may also be carried out by I/O hub 120 and this is usually done by initiating one or more DMA transfers between DMA-enabled components 107 and/or main memory 101 to peripheral devices 112 and then verifying that the source and destination memory areas match after the DMA transfers have been completed.

During the POR cycle, diagnostic tests may also be carried out on peripheral devices 112 that are connected to host device 150. These diagnostic tests are typically unique to the type of peripheral device that is being tested and usually involves processor 110 sending a series of instructions to the peripheral device and validating the response received from the peripheral device. Similar diagnostics tests may also be carried out on components 106 and are usually unique to the type of component that is being tested.

In embodiments of the invention, as the various diagnostic tests are carried out (during the POR cycle), security module 190 is configured to make use of I/O hub 120 to capture data (or instructions) executed by processor 110 during the CPU test so that module 190 may make use of this data to identify the architecture or type of processor 190. This may be done by comparing the sequence of instructions or data transmitted during the CPU test with information found in a processor-database that is preloaded into module 190.

In further embodiments of the invention, security module 190 is configured to also make use of I/O hub 120 to capture all the memory locations of main memory 101 during the initialization of the RAM (or during the March test as described above) so that module 190 may make use of this data to accurately obtain the addresses of main memory 101. This information may then be stored in module 190 and may be used to create a memory map of main memory 101.

In other embodiments of the invention, security module 190 is configured to also make use of I/O hub 120 to identify peripheral devices that are able to directly access main memory 101 and/or DMA-enabled components 107 during the DMA controller test. This information may then be stored in module 190 and may be used to generate a list of peripheral devices that are able to communicate directly with main memory 101 and/or DMA-enabled components 107 through a DMA system.

In still further embodiments of the invention, security module 190 is also configured to make use of I/O hub 120 to identify all the peripheral devices and components that are communicatively connected to processor 110 during the respective peripheral device and component diagnostic tests so that module 190 may make use of this data to generate a list of devices that are communicatively connected to host device 150 and a list of components that are communicatively connected to processor 110.

It should be noted that security module 190 is configured to passively monitor data transmitted through bus system 122 (either via processor 110 or directly to main memory 101 and/or DMA-enabled components 107) and that host device 150 may not send data or address signals to module 190. As a result, the security posture of module 190 will never be affected by host device 150.

In embodiments of the invention, when bus 122 comprises a Peripheral Component Interconnect Express (PCIe) bus, module 190 may be configured to link up with the main memory 101 and/or DMA-enabled components 107 through a direct memory access (DMA) system that utilizes the PCIe protocol. This means that during the diagnostic tests occurring during the POR cycle, module 190 may be configured to capture all data transaction layer packets (TLPs) broadcasted through the PCIe bus. By capturing all the TLPs, module 190 would be able to identify each frame's direction, status and any other information required to identify anomalies in the transmitted data in accordance with embodiments of the invention.

Once the POR cycle of host device 150 has been completed, host device 150 will then proceed with its normal boot process, which is to load the operating system for the computer into volatile memory 102 so that host device 150 will be able to quickly access, load and run the operating system.

At this stage, module 190 would have acquired at the very least, information about processor 190 (such as its architecture and its type), a memory map of main memory 101, a list of peripheral devices that are able to directly main memory 101 and/or DMA-enabled components 107 through a DMA system, a list of peripheral devices that are communicatively connected to host device 150 and/or a list of hardware components found in host device 150. One skilled in the art will recognize that module 190 may also acquire other different types of information about components 106 as long as diagnostic tests are also applied to these components during the diagnostic tests of host device 150 (which take place during the POR cycle of the host device) and provided that module 190 is able to capture the data exchanged between the processor and the respective components during the tests. This information may then be utilized by module 190 to retrieve databases associated with each of the identified hardware components mentioned above.

Security module 190 then utilizes this information to monitor main memory 101, components 106 and/or DMA-enabled components 107 for anomalous activities taking place within host device 150 or security weaknesses that may be affecting host device 150.

In an embodiment of the invention, module 190 may be configured to use the memory map of main memory 101 to generate a virtual disk that is a copy of main memory 101 and this virtual disk is then stored within module 190. The exact details of the creation of the virtual disk is omitted for brevity as it is known to those skilled in the art. Once the virtual disk is created, any data newly written to or newly deleted from main memory 101 is then acquired by module 190 and replicated in the virtual disk. Module 190 is then configured to determine if security violations are occurring within the systems of host device or peripheral devices connected to the host device based on the content of the virtual disk.

In embodiments of the invention, only data written to or deleted from volatile memory 102 is replicated in the virtual disk and used by module 190 to determine if anomalous activities are taking place. One skilled in the art will note that this embodiment may be applied to other embodiments of the invention without departing from the inventive concept of the invention.

Comparison of Checksums

In an embodiment of the invention, as the operating system is being loaded in host device 150, similar instructions will be loaded onto the virtual disk in module 190. Hence, security module 190 may use the information in the virtual disk to obtain information about the operating system such as its type, e.g. Microsoft Windows, its version (e.g. version 10), any other relevant information and the checksum associated with the operating system. Based on the information obtained about the operating system, module 190 will then retrieve a corresponding reference verified checksum, from a database that is preloaded in module 190. This preloaded database may be continuously updated with the latest information from the authorized software developers so that module 190 will always have the latest checksums for the latest versions of operating systems.

Module 190 will then compare the checksum obtained from the operating system with the corresponding reference verified checksum to determine if any parts of the operating system has been modified or altered. If the checksums do not match, this implies that the loaded operating system has been tampered with and security module 190 will then proceed to trigger a corresponding alert.

In further embodiments of the invention, the database in module 190 may also be preloaded with checksums of other software as obtained from the authorized developers of these software or official firmware updates as obtained from the manufacturers of the peripheral devices. In this embodiment, when the other software or firmware is being loaded into main memory 101, similar instructions will be replicated in the virtual disk of module 190. At this stage, module 190 may then use the content in the virtual disk to identify the software or firmware that is being loaded, obtain from the preloaded database a corresponding verified checksum and compare this corresponding verified checksum with a checksum obtained from the loaded software to determine if the software has been tampered with.

This process continuously repeats each time a new software, firmware or program is loaded so that module 190 is able to continuously determine if each newly loaded software or firmware has been tampered or altered from its original form.

Identification of Anomalous Activities Based on Captured Patterns

In embodiments of the invention, module 190 may be preloaded with a database of known malware, known malicious firmware/BIOS/UEFI updates and any other sequence of instructions that are known to be malicious such as, but are not limited to, large scale encryption of sections of non-volatile memory; installation of unusual firmware, BIOS or software updates; abnormal interrupt routines; abnormal modifications to computer memories; or the constant transmission of data to unsecure servers either through wireless or wired means.

One skilled in the art will recognize that all the databases in module 190 may be continuously updated with the latest information so that the information contained within will constantly remain relevant and that new databases associated with new hardware components may also be added to module 190 without departing from this invention.

As the instructions are being loaded into main memory 101, these similar instructions would also be replicated in the virtual disk of module 190. Module 190 is then configured to compare the instructions, either sequentially as the instructions are loaded, or over a predetermined time frame (i.e. the start of a new sequence of instructions or a fixed time period) with the appropriate database of malicious instructions as described above. By doing so, module 190 would be able to detect malicious instructions as it is being loaded. This would then allow module 190 sufficient time to initiate countermeasures, such as alerting the host device's administrator or halting the execution of the instructions at the host device.

This process continuously repeats as new instructions or data are loaded into main memory 101 so that module 190 is able to continuously determine if each new sequence of instructions contains malware or anomalous activities.

In other embodiments of the invention, security module 190 may be loaded with a trained supervised machine learning model comprising models such as support vector machines, neural networks or k-nearest neighbour. It is noted that the supervised machine learning model may be trained using a data set of instructions that has been labelled as "normal" and another dataset of instructions associated with malware or any malicious activities, i.e. "abnormal". The detailed training of the supervised machine learning model is omitted as it is well known in the art.

Instructions loaded into the virtual disk are then provided to the trained supervised machine learning model. The trained supervised machine learning model will then identify anomalies in the instructions based on the input provided. In other words, through the use of this trained machine learning model, module 190 will be able to detect malicious instructions as it is being loaded allowing module 190 to have sufficient reaction time.

In other embodiments of the invention, module 190 would capture and store all data transferred between components 106 and peripheral devices 112; and/or data transferred between DMA-enabled components 107 and peripheral devices 112 through bus system 122.

It should be noted that based on the hardware components that were identified during the diagnostic tests that occurred during the POR cycle of the host device, module 190 would have retrieved databases associated with each of these identified components from its memory or storage. This allows the security violation detection process to be carried out more efficiently and effectively as module 190 would not have to compare newly acquired data with a great number of irrelevant databases.

Once the new data is captured, module 190 is then configured to compare the newly acquired data, either sequentially as the data is received or transmitted, or over a predetermined time frame (i.e. the start of a new sequence of data frames or a fixed time period) with the appropriate database of known malicious data transmissions/interrupts/sequences and etc. For example, if module 190 acquires new data associated with the graphics processing unit (GPU) of the host device, module 190 would compare the newly acquired data with the information contained in a database associated with the GPU whereby this database would contain all the known malware patterns associated with this type of GPU. This database associated with the GPU would have been retrieved by module 190 from its memory or storage device after the POR cycle has been completed by the host device as module 190 would have been able to utilize the diagnostic data obtained during the POR cycle to determine the type of GPU that is provided within the host device.

By doing so, module 190 would be able to detect malicious activities taking place at components 106, peripheral devices 112 and/or DMA-enabled components 107 as it is taking place. This would then allow module 190 sufficient time to initiate countermeasures, such as alerting the host device's administrator or halting the execution of the instructions at the host device.

This process continuously repeats as data is transferred through bus system 122 so that module 190 is able to continuously determine if each new sequence of instructions or data contains malware or anomalous activities and as data is exchanged between main memory 101, components 106/DMA-enabled components 107 and peripheral devices 112.

Figure 2:
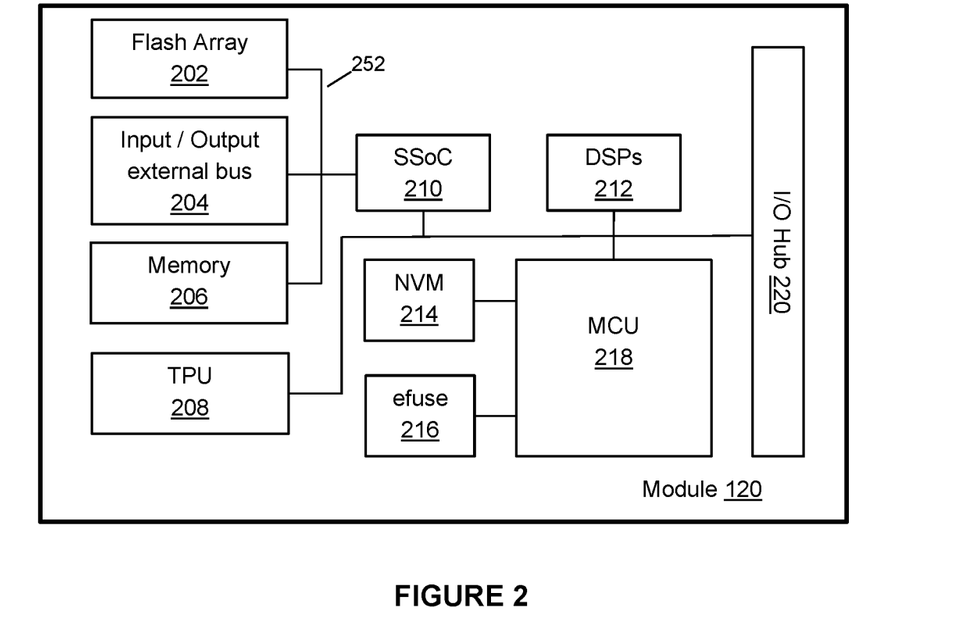
FIG. 2 illustrating a block diagram representative of components provided within a module for executing embodiments in accordance with embodiments of the invention.

FIG. 2 illustrates a block diagram representative of components that may be provided within module 120 for executing embodiments in accordance with embodiments of the invention. A person skilled in the art will recognize that components in module 120 may vary from embodiment to embodiment and FIG. 2 is provided by way of example only.

Herein the term "processor" is used to refer generically to any device or component that can process such instructions and may include: a microprocessor, microcontroller (MCU), programmable logic device or other computational device. That is, MCU 218 may be provided by any suitable logic circuitry for receiving inputs, processing them in accordance with instructions stored in memory 206 and generating outputs (i.e. to the input/output external bus 204 component, the I/O hub 220 through bus 252 and etc.). In this embodiment, MCU 218 may comprise a single core or multi-core processor with memory addressable space. In one example, MCU 218 may include a multi-core processor, comprising—for example—an 8 core CPU. Further, MCU 218 may be mounted on a circuit board and may be configured to processes instructions and data for performing methods of embodiments of the invention.

MCU 218 and Secure System-on-Chip (SSoC) 210 are in data communication with the other components in module 120 via bus 252. SSoC 210 may be configured to carry out the initialization steps when module 120, host device 102 and/or peripheral device 104 is powered on and/or booted up. These initialization steps may be stored in a secure section of memory 206 or within SSoC 210. Further, all the preloaded databases, models or records may be stored in memory 206 as required.

The components provided within module 120 include memory 206, flash array 202, Input/output (I/O) hub 220 for communicating with other I/O hubs, input/output external bus 204, tensor processing unit (TPU) 208, non-volatile memory (NVM) 214, digital signal processors (DSPs) 212 and electronic fuse (eFuse) 216. eFuse 216 is used to store secret keys, device identities, product identities or any other such data that may not be written over or edited. When this information is fused into eFuse 216, the data is maintained in the registers of Efuse 216 and may not be erased. Input/output external bus 204 may also be configured to communicate with other external modules as required.

Module 120 also includes non-volatile memory (NVM) 214 storage medium that may be electrically erased and programmed. An example of such a non-volatile memory storage would be NAND or NOR type flash memory or non-flash EEPROM flash memory. Volatile memory 206 may comprise static random access memory (SRAM), dynamic-random access memory (DRAM), or Random Access Memory (RAM) 220. One skilled in the art will recognize that the various memory components described above comprise non-transitory computer-readable media and shall be taken to comprise all computer-readable media except for a transitory, propagating signal. Typically, the instructions are stored as program code in the memory components but can also be hardwired.

Input/output (I/O) interface hub 220 may also be configured to communicate with various types of user interfaces, communications interfaces and bus interfaces. The I/O hub 220 may be configured to communicate with communication interfaces to transmit/receive regular data and/r high speed data to/from external sources via a wired or wireless network to other processing devices or to receive data via the wired or wireless network. Wireless networks that may be utilized include, but are not limited to, Wireless-Fidelity (Wi-Fi), Bluetooth, Near Field Communication (NFC), cellular networks, satellite networks, telecommunication networks, Wide Area Networks (WAN) and etc.

It is useful to note that when information or data is transmitted on the bus system of host device 150 or between host device 150 and peripheral devices 112, the data will appear as a sequence of logical values. The sequence may comprise a data part, an address part (i.e. the address of the receiver), and an opcode that identifies the type of data that is sent, i.e. a preamble and/or any data integrity algorithm to identify the data or the presence of the data.

Figure 3:
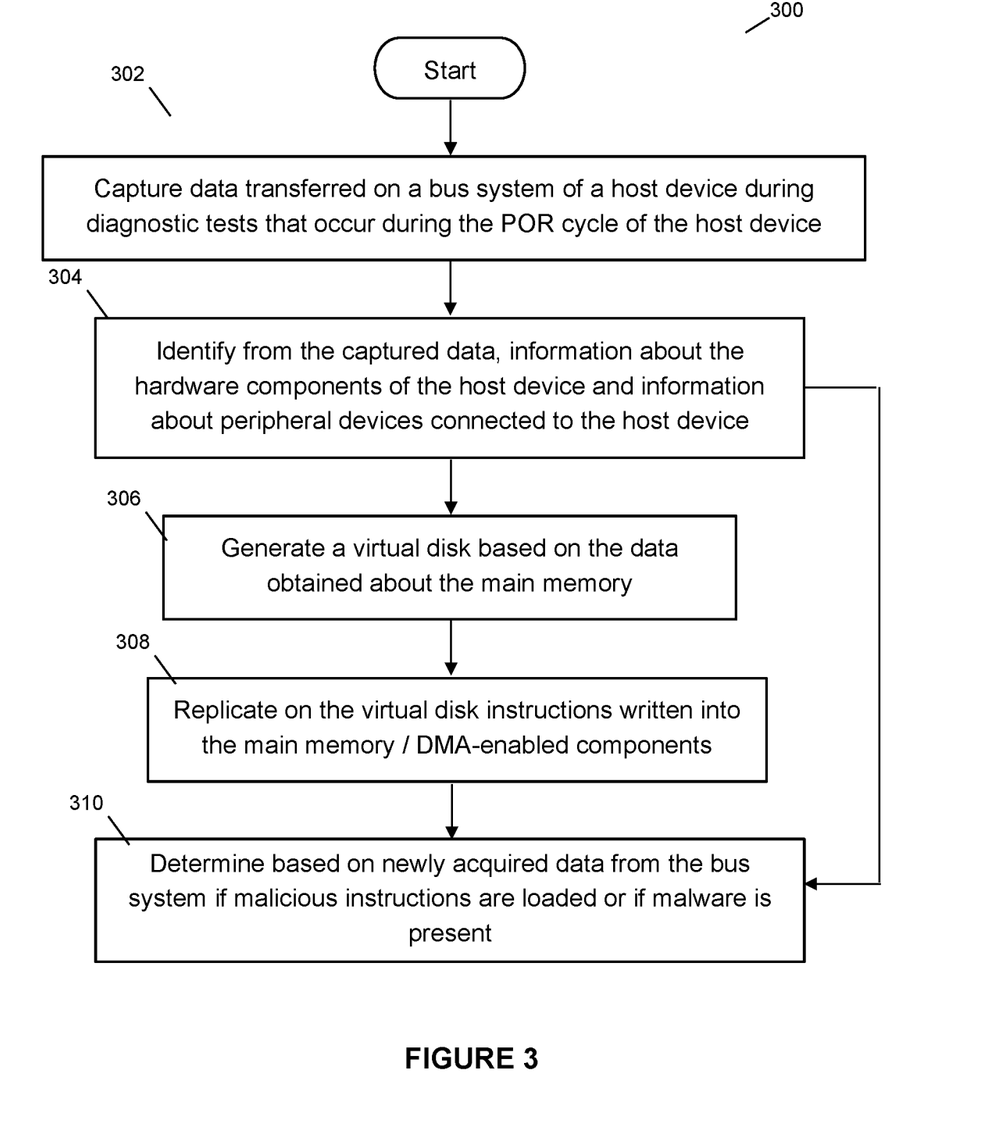
FIG. 3 illustrating a flow diagram of a for monitoring the main memory and hardware components of a host device for anomalous activities or security weaknesses in accordance with embodiments of the invention.

FIG. 3 illustrates process 300 for monitoring the main memory of a host device for anomalous activities or security weaknesses in accordance with embodiments of the invention whereby process 300 may be implemented in security module 190. It is assumed that module 190 is communicatively connected to host device 120 through I/O hub 120 of host device 150 thereby allowing module 190 to capture all data being transmitted on bus system 122.

Process 300 begins at step 302 with process 300 capturing data transmitted between a processor of the host device and the main memory of the host device; between the processor and peripheral devices connected to the host device; and between components/DMA-enabled components provided in the host device and peripheral devices connected to the host device during diagnostic tests performed by the host device during the Power-On-Reset (POR) cycle of the host device. In other words, at step 302, process 300 will capture all data that is being transferred through the bus system of the host device during the POR cycle, including data transferred through DMA systems.

Process 300 then utilizes the captured data to identify information about the various hardware components of the hard disk whereby these hardware components may include the addresses of the main memory, the type and architecture of the processor, the identity and types of peripheral devices that may be connected directly (through the DMA system) or indirectly to the memory of the host device, the types of hardware components provided within the host device, the types of DMA-enabled hardware components provided within the host device and etc. All this takes place at step 304.

All the obtained information may then be utilized by process 300 to retrieve the relevant information (as contained in associated databases) information associated with the processor of the host device, the components/DMA-enabled components found in the host device and the peripheral devices that are connected directly (through a DMA system) or indirectly to the memory of the host device. In embodiments of the invention, this information may relate to, but is not limited to, databases containing verified checksums, known firmware/software updates, known malware or malicious instructions associated with certain hardware components, peripheral devices or processors, read/write protocols, boot-up protocols, communication protocols, power down/up protocols, and any other types of protocols that may alter the content of software, firmware, BIOS, UEFI, applications and etc.

In an embodiment of the invention, process 300 then proceeds to generate, at step 306, a virtual disk in the security module based on the memory map or the obtained addresses of the main memory. Once this is done, process 300 will then replicate all instructions that are written in the main memory onto the virtual disk. This takes place at step 308. By doing so, process 300 would be able to process the instructions in the virtual disk and/or run a series of tests on the instructions in the virtual disk independently from the instructions that are being executed in the host device.

In further embodiments of the invention, data sent directly between peripheral devices and the DMA-enabled components of the host device may also be stored in the virtual disk.

At step 310, process 300 may then determine, based on the content contained in the virtual disk (which comprises newly acquired data from the bus system), whether malware is being executed in the main memory of the host device, whether anomalous activities are being loaded or whether the DMA-enabled components are being attacked by malicious third parties. Based on this determination, process 300 may then either carry out countermeasures (not shown) or may continue to passively monitor the main memory and/or the DMA-enabled components of the host device as described in steps 308-310. For completeness, the countermeasures that may be carried out by process 300 include, but are not limited to, alerting the administrator of the host device, halting all operations on the host device, preventing further data transfers from taking place on the host device or shutting down the host device.

In another embodiment of the invention, after step 304, process 300 may instead bypass steps 306 and 308 and proceed directly to step 310. In this embodiment, process 300 acquires the new data directly from the bus system and determines, based on the newly acquired data and based on a retrieved database associated with the identified hardware component that a security violation is occurring at the identified hardware component.

Figure 4:
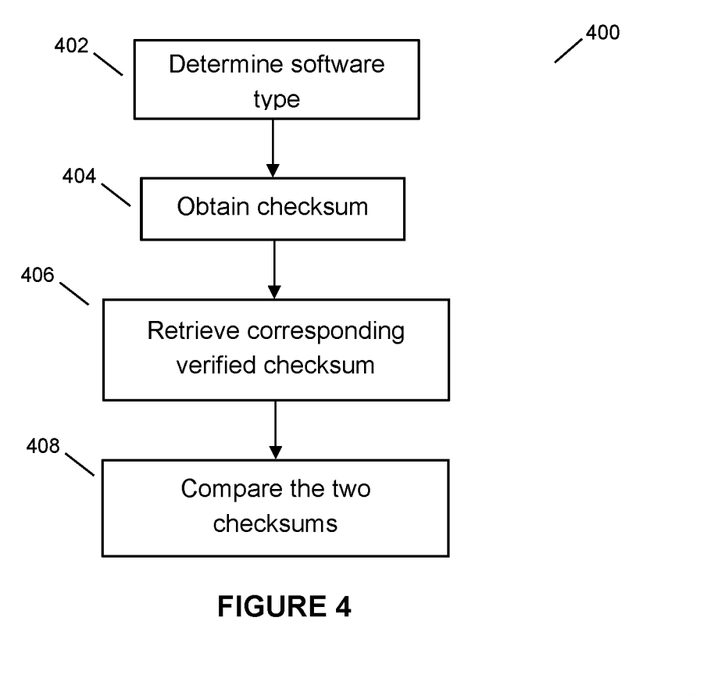
FIG. 4 illustrating a flow diagram of a process or a method for verifying integrity of software based on the checksum of the software in accordance with embodiments of the invention.

FIG. 4 illustrates process 400 for determining the integrity of a software that is being loaded in the host device based on the checksum of the software whereby process 400 may be implemented in security module 190 in accordance with embodiments of the invention.

Process 400 begins at step 402 with process 400 utilizing the instructions in the virtual disk (which are replicated from the contents of the main memory) to determine the software that is being loaded in the host device.

At step 404, process 400 will then obtain the checksum of the software that is being loaded from the information contained in the virtual disk. Based on the information obtained about the software that is being loaded, process 400 will then, at step 406, retrieve a corresponding reference verified checksum, from a database that is preloaded in module 190. This preloaded database may be continuously updated with the latest information from the authorized software developers so that module 190 will always have the latest checksums for the latest versions of operating systems.

Process 400 will then compare the checksum of the software that is being loaded from the information contained in the virtual disk with the corresponding reference verified checksum to determine if any parts of the software has been modified or altered. This takes place at step 406. If the checksums do not match, this implies that the loaded operating system has been tampered with and security module 190 will then proceed to trigger a corresponding alert.

Process 400 may then continuously repeat itself to passively monitor software that are being loaded or executed in the host device.

Figure 5:
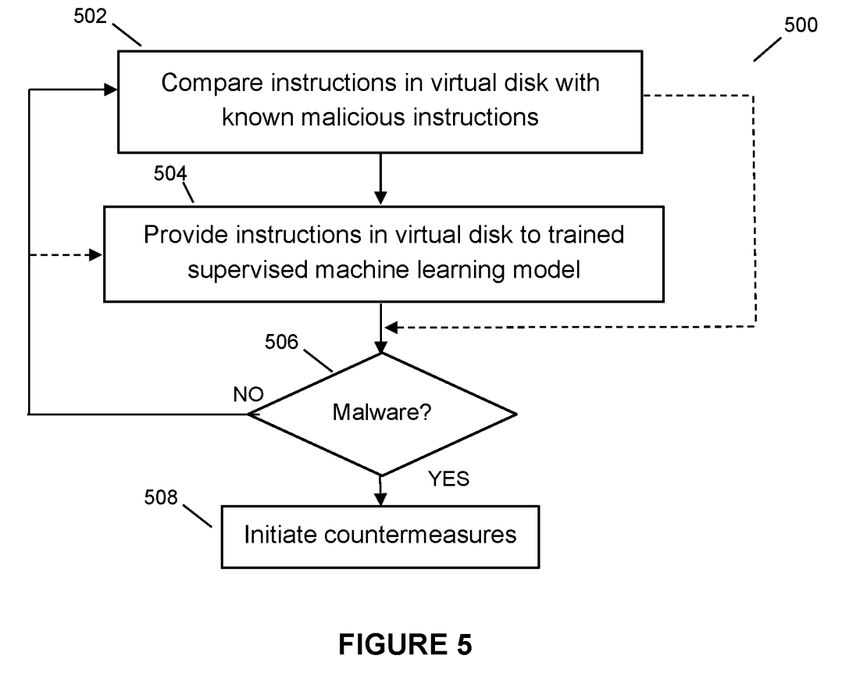
FIG. 5 illustrating a flow diagram of a process or a method for verifying the integrity of instructions being executed in the main memory of the host device in accordance with embodiments of the invention.

FIG. 5 illustrates process 500 for determining the integrity of instructions or commands that are being loaded in the host device whereby process 500 may be implemented in security module 190 in accordance with embodiments of the invention.

Process 500 may begin at either step 502 or 504. If process 500 begins at step 502, it may then proceed to step 504 or directly to step 506. If process 500 begins at step 504, it may then proceed to step 506 or may go through step 502 before proceeding to step 506.

At step 502, process 500 will utilize the instructions in the virtual disk (which are replicated from the contents of the main memory) or data contained in the virtual disk (which are captured from the transmissions between the DMA-enabled components and peripheral devices) to determine the type of instructions that are being loaded or executed. For example, the instructions may be associated with one of the peripheral devices as identified during the diagnostic tests that occurred in the POR cycle, may be associated with the hardware components of the host device as identified during the diagnostic tests that occurred in the POR cycle or etc.

Based on the type of instructions or data captured, process 500 will then load an associated database containing known malware or malicious instructions whereby the instructions and/or data in the virtual disk are compared with the information and/or data in the database.

At step 504, the instructions and/or data in the virtual disk may be provided to a trained supervised machine learning model which has been configured to detect anomalous activities. The outcomes from steps 502 and/or 504 are then assessed by process 500 at step 506. If process 500 determines that malware or malicious activities are taking place in the host device, it will proceed to step 508 whereby countermeasures may then be carried out. Conversely, it may return to steps 502/504 to continuously monitor the host device in a passive manner.

Numerous other changes, substitutions, variations and modifications may be ascertained by the skilled in the art and it is intended that the present invention encompass all such changes, substitutions, variations and modifications as falling within the scope of the appended claims.

The invention claimed is:

1. A security module comprising:
   an interface configured to connect to a bus system of a host device;
   a processor; and
   a non-transitory media readable by the processor, the media storing instructions that when executed by the processor cause the processor to:
   capture diagnostic data transmitted through the bus system of the host device when diagnostic tests are executed by the host device during a Power-on-Reset (POR) cycle of the host device;
   identify, from the captured diagnostic data, hardware components associated with the host device that were initially unknown to the security module and retrieve databases associated with each of the identified hardware components;
   acquire data from the bus system that is associated with a first identified hardware component; and
   determine, based on the acquired data and based on a retrieved database associated with the first identified hardware component, if a security violation is occurring at the first identified hardware component.

2. The security module according to claim 1 wherein the capture diagnostic data comprise addresses of the host device's main memory and wherein the first identified hardware component comprises the host device's main memory, and further comprises instructions that when executed by the processor, before the step of determining that a security violation is occurring at the first identified hardware component, cause the processor to:
   generate a virtual disk based on the addresses of the host device's main memory; and
   write the acquired data to the virtual disk as the new data is concurrently acquired from the host device's main memory.

3. The security module according to claim 2 wherein the instructions to determine if a security violation is occurring further comprises instructions that when executed by the processor cause the processor to:
   identify, based on the data newly written to the virtual disk, a software application that is being loaded in the main memory of the host device;
   retrieve, from the main memory, a checksum associated with the software application; and
   determine that the security violation is occurring at the main memory when the retrieved checksum does not match with a verified checksum obtained from the retrieved database associated with the main memory.

4. The security module according to claim 2 wherein instructions to determine if a security violation is occurring further comprises instructions that when executed by the processor cause the processor to:
   compare the newly written data in the virtual disk with malware patterns obtained from the retrieved database associated with the main memory; and
   determine that the security violation is occurring at the main memory when at least a part of the newly written data matches with the obtained malware patterns.

5. The security module according to claim 4 wherein the malware patterns comprise instructions to encrypt large parts of the main memory, instructions to modify a Unified Extensible Firmware Interface (UEFI) or Basic Input Output System (BIOS) of the host device, abnormal interrupt routines or instructions to continuously transmit data through unsecured wireless or wired transmission means.

6. The security module according to claim 2 wherein the instructions to determine if a security violation is occurring further comprises instructions that when executed by the processor cause the processor to:
   provide the data newly written to the virtual disk to a trained supervised machine learning model, whereby the trained supervised machine learning model is configured to detect anomalies in the data; and
   determine that the security violation is occurring at the main memory when the number of detected anomalies exceeds a predetermined threshold.

7. The security module according to claim 1 wherein the first identified hardware component comprises a direct memory access (DMA) enabled component and wherein the instructions to determine if a security violation is occurring further comprises instructions that when executed by the processor cause the processor to:
   compare the acquired data associated with the DMA enabled component with malware patterns obtained from the retrieved database associated with the DMA enabled component whereby it is determined that the security violation is occurring at the DMA enabled component when at least a part of the newly written data matches with the obtained malware patterns,
   wherein the acquired data comprises data that is directly addressed to the DMA enabled component or data that is generated directly by the DMA enabled component.

8. The security module according to claim 1 wherein the first identified hardware component comprises an electronic device and wherein the instructions to determine if a security violation is occurring further comprises instructions that when executed by the processor cause the processor to:
   compare the acquired data associated with the electronic device with malware patterns obtained from the retrieved database associated with the electronic device whereby it is determined that the security violation is occurring at the electronic device when at least a part of the newly written data matches with the obtained malware patterns.

9. The security module according to claim 1 wherein the first identified hardware component comprises a peripheral device and wherein the instructions to determine if a security violation is occurring further comprises instructions that when executed by the processor cause the processor to:
   compare the acquired data associated with the peripheral device with malware patterns obtained from the retrieved database associated with the peripheral device whereby it is determined that the security violation is occurring at the peripheral device when at least a part of the newly written data matches with the obtained malware patterns.

10. The security module according to claim 1 further comprising instructions that when executed by the processor cause the processor to:
    acquire data from the bus system that is associated with a second identified hardware component; and
    determine, based on the acquired data and based on a retrieved database associated with the second identified hardware component, if a security violation is occurring at the second identified hardware component.

11. A method for detecting security violations associated with a host device using a security module communicatively connected to a bus system of the host device, the method comprising the steps of:
- capturing, using the security module, diagnostic data transmitted through the bus system of the host device when diagnostic tests are executed by the host device during a Power-On-Reset (POR) cycle of the host device;
- identifying from the captured diagnostic data, using the security module, hardware components associated with the host device that were initially unknown to the security module and retrieving databases associated with each of the identified hardware components;
- acquiring, using the security module, data from the bus system that is associated with a first identified hardware component; and
- determining based on the acquired data and based on a retrieved database associated with the first identified hardware component, using the security module, if a security violation is occurring at the first identified hardware component.

12. The method according to claim 11 wherein the capture diagnostic data comprise addresses of the host device's main memory and wherein the first identified hardware component comprises the host device's main memory, and before the step of determining that a security violation is occurring at the first identified hardware component, the method further comprises the steps of:
- generating, using the security module, a virtual disk based on the addresses of the host device's main memory; and
- writing, using the security module, the acquired data to the virtual disk as the new data is concurrently acquired from the host device's main memory.

13. The method according to claim 12 wherein the determining if a security violation is occurring further comprises the steps of:
- identifying based on the data newly written to the virtual disk, using the security module, a software application that is being loaded in the main memory of the host device;
- retrieving from the main memory, using the security module, a checksum associated with the software application; and
- determining, using the security module, that the security violation is occurring at the main memory when the retrieved checksum does not match with a verified checksum obtained from the retrieved database associated with the main memory.

14. The method according to claim 12 wherein the determining if a security violation is occurring further the steps of:
- comparing, using the security module, the newly written data in the virtual disk with malware patterns obtained from the retrieved database associated with the main memory; and
- determining, using the security module, that the security violation is occurring at the main memory when at least a part of the newly written data matches with the obtained malware patterns.

15. The method according to claim 14 wherein the malware patterns comprise instructions to encrypt large parts of the main memory, instructions to modify a Unified Extensible Firmware Interface (UEFI) or Basic Input Output System (BIOS) of the host device, abnormal interrupt routines or instructions to continuously transmit data through unsecured wireless or wired transmission means.

16. The method according to claim 12 wherein the determining if a security violation is occurring further comprises the steps of:
- providing, using the security module, the data newly written to the virtual disk to a trained supervised machine learning model, whereby the trained supervised machine learning model is configured to detect anomalies in the data; and
- determining, using the security module, that the security violation is occurring at the main memory when the number of detected anomalies exceeds a predetermined threshold.

17. The method according to claim 11 wherein the first identified hardware component comprises a direct memory access (DMA) enabled component and wherein the determining that a security violation is occurring further comprises the steps of:
- comparing, using the security module, the acquired data associated with the DMA enabled component with malware patterns obtained from the retrieved database associated with the DMA enabled component whereby it is determined that the security violation is occurring at the DMA enabled component when at least a part of the newly written data matches with the obtained malware patterns,
  - wherein the acquired data comprises data that is directly addressed to the DMA enabled component or data that is generated directly by the DMA enabled component.

18. The method according to claim 11 wherein the first identified hardware component comprises an electronic device and wherein the determining that a security violation is occurring further comprises the steps of:
- comparing, using the security module, the acquired data associated with the electronic device with malware patterns obtained from the retrieved database associated with the electronic device whereby it is determined that the security violation is occurring at the electronic device when at least a part of the newly written data matches with the obtained malware patterns.

19. The method according to claim 11 wherein the first identified hardware component comprises a peripheral device and wherein the determining if a security violation is occurring further comprises the steps of:
- comparing, using the security module, the acquired data associated with the peripheral device with malware patterns obtained from the retrieved database associated with the peripheral device whereby it is determined that the security violation is occurring at the peripheral device when at least a part of the newly written data matches with the obtained malware patterns.

20. The method according to claim 11 further comprising the steps of:
- acquiring, using the security module, data from the bus system that is associated with a second identified hardware component; and
- determining, using the security module, based on the acquired data and based on a retrieved database associated with the second identified hardware component, that a security violation is occurring at the second identified hardware component.

* * * * *